United States Patent [19]

Baur

[11] Patent Number: 5,610,629
[45] Date of Patent: *Mar. 11, 1997

[54] PEN INPUT TO LIQUID CRYSTAL DISPLAY

[75] Inventor: Peter F. Baur, Augsburg, Germany

[73] Assignee: NCR Corporation, Dayton, Ohio

[*] Notice: The term of this patent shall not extend beyond the expiration date of Pat. No. 5,243,452.

[21] Appl. No.: 275,465

[22] Filed: Jul. 14, 1994

Related U.S. Application Data

[63] Continuation of Ser. No. 38,367, Mar. 29, 1993, abandoned, which is a continuation-in-part of Ser. No. 805,450, Dec. 6, 1991, Pat. No. 5,243,452.

[51] Int. Cl.$^6$ ................................................. G09G 5/00
[52] U.S. Cl. ........................... 345/104; 345/182; 345/173
[58] Field of Search ........................ 341/34, 23; 345/156, 345/173, 182, 104, 87, 98, 100, 103; 178/18, 19

[56] References Cited

U.S. PATENT DOCUMENTS

| | | |
|---|---|---|
| 3,772,518 | 11/1973 | Murayama et al. . |
| 4,185,165 | 1/1980 | Fencl . |
| 4,345,248 | 8/1982 | Togashi et al. . |
| 4,430,648 | 2/1984 | Togashi et al. . |
| 4,456,787 | 6/1984 | Schlosser et al. . |
| 4,516,112 | 5/1985 | Chen ........................................ 341/34 |
| 4,583,087 | 4/1986 | Van De Venne . |
| 4,644,102 | 2/1987 | Blesser et al. . |
| 4,655,552 | 4/1987 | Togashi et al. . |
| 4,701,024 | 10/1987 | Kobayashi et al. . |
| 4,715,685 | 12/1987 | Yaniv et al. . |
| 4,719,457 | 1/1988 | Kitajima et al. . |
| 4,723,836 | 2/1988 | Kono et al. . |
| 4,730,186 | 3/1988 | Koga et al. . |
| 4,736,073 | 4/1988 | Abernethy . |
| 4,767,192 | 8/1988 | Chang et al. . |
| 4,814,760 | 3/1989 | Johnston et al. ........................ 345/104 |
| 4,825,202 | 4/1989 | Dijon et al. . |
| 4,859,814 | 8/1989 | Sciacero et al. . |
| 4,980,646 | 12/1990 | Zemel ...................................... 178/18 |
| 5,008,497 | 4/1991 | Asher . |
| 5,064,275 | 11/1991 | Tsunoda et al. . |
| 5,136,125 | 8/1992 | Russell . |
| 5,159,323 | 10/1992 | Mase et al. . |
| 5,218,174 | 6/1993 | Gray et al. . |
| 5,241,308 | 8/1993 | Young ...................................... 341/34 |
| 5,243,452 | 9/1993 | Baur . |

FOREIGN PATENT DOCUMENTS

| | | |
|---|---|---|
| 8909960 | 10/1989 | European Pat. Off. . |
| 3822477 | 1/1990 | Germany . |
| 2162673 | 2/1986 | United Kingdom . |

Primary Examiner—Curtis Kuntz
Assistant Examiner—Vivian W. Chang
Attorney, Agent, or Firm—Gregory A. Welte; James H. Beusse

[57] ABSTRACT

A liquid crystal display comprises multiple capacitors which apply electric fields to liquid crystal material located between the capacitor plates. In the invention, each capacitor is associated with a sensor which detects the presence of a hand-held stylus. The detection can be done optically, acoustically, by pressure, by temperature, or by other means.

9 Claims, 21 Drawing Sheets

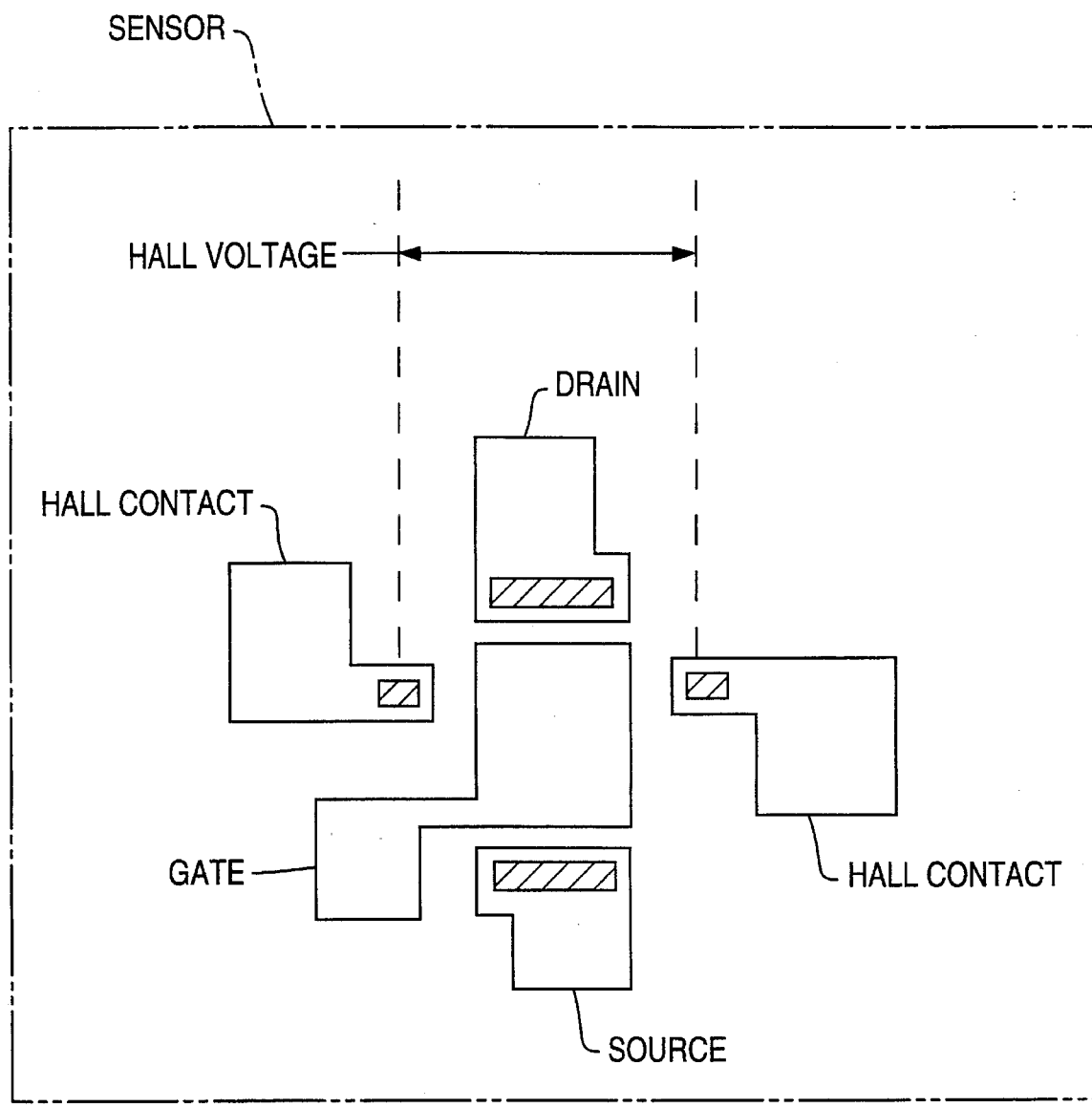

PEN INPUT TO LIQUID CRYSTAL DISPLAY

This application is a continuation of application Ser. No. 08/038,367, filed Mar. 29, 1993, now abandoned, which is a continuation-in-part of application Ser. No. 07/805,450, filed Dec. 6, 1991, now U.S. Pat. No. 5,243,452.

The invention concerns approaches to using a stylus as an input device to a liquid crystal display. Such displays are used in portable computers, and the stylus is used as a replacement, or adjunct, to a keyboard.

BACKGROUND OF THE INVENTION

FIG. 1 illustrates nine pixels of a Liquid-Crystal Display (LCD). Each box labeled DEVICE represents one of the LCD elements. Each LCD element is called a pixel. The transistors labeled MOS turn their respective pixels on and off.

The operation of the LCD can be explained, in a very simplified manner, as follows. In FIG. 2, liquid crystal material M is contained between the plates P of a capacitor C. (Each box labeled "DEVICE" in FIG. 1 contains one of the devices shown in FIG. 2.)

Each plate P in FIG. 2 actually takes the form of a thin coating of Indium Tin Oxide, ITO, on GLASS, as indicated in FIG. 3A. Each coating of ITO, in turn, bears a coating of polyimide, as indicated in the insert 4 shown in FIG. 3C. The polyimide has been rubbed, during manufacture, in a uni-directional manner. The rubbing causes the molecules of the liquid crystal material, which are adjacent to the polyimide, to align with the direction of rubbing. For example, molecules M1 and M2 align as shown.

The polyimide layers are arranged such that the aligned molecules M1 and M2 are perpendicular to each other, as shown. The molecules located in the bulk of the liquid crystal try to align themselves with M1 and M2, but, because M1 and M2 are perpendicular, the bulk molecules align into a helix H which bridges M1 and M2.

Polarizing filters are affixed to each sheet of GLASS, as indicated. When incoming LIGHT enters, as shown in FIG. 3B, the polarization of the LIGHT follows the twisted molecules, and the LIGHT undergoes a continuous 90-degree twist, as shown, and exits through the bottom polarizing filter. The human EYE, perceives the pixel as bright, because of the exiting LIGHT.

However, when a small voltage (such as 3–5 volts) is applied between the ITO plates, the voltage creates an ELECTRIC FIELD in FIG. 4, which disturbs the gradual twist of the molecules. The helix no longer exists. The light is no longer twisted as it travels, but is blocked by the lower polarizing filter, as shown in FIG. 5. The pixel appears dark.

In an actual LCD, the number of pixels is quite large. For example, the display of a small computer can contain an array of 480×640 pixels, giving a total of 307,200 pixels. With such a large number of pixels, the voltage described in connection with FIG. 4 is applied to each MOS in multiplex fashion.

In multiplexing, there exists an external Random-Access Memory (termed Video RAM, or V-RAM) which contains a memory cell for each pixel. A video controller (not shown) writes data, which represents the image to be displayed, into the V-RAM. Then, other circuitry (not shown) reads each cell in the V-RAM, and applies the proper voltage to the corresponding MOS, causing each pixel to become bright or dark, as appropriate.

The charge which produces the ELECTRIC FIELD shown in FIG. 4 does not last forever, but dissipates with time. Consequently, the video display is "refreshed" periodically, to restore the charge. In one type of refreshing, a controller (indicated in FIG. 1) reads each memory cell in V-RAM, and applies the proper charge to each MOS of each pixel, based on the memory cell's contents.

FIG. 1 is somewhat exaggerated for clarity: the Metal Oxide Semiconductor Transistors (MOS) actually occupy proportionately less space than shown, and the DISPLAY occupies greater space. The reason for giving the DISPLAY element more space is to allocate maximum area to the information-producing component, namely, the DISPLAY element.

LCD displays are becoming widely used, especially in portable computers having pen-type input devices (which augment, or substitute for, keyboard input). It is desirable to provide an improved system for responding to pen-type input.

OBJECT OF THE INVENTION

It is an object of the invention to provide an improved system for obtaining input to a device using an LCD display.

SUMMARY OF THE INVENTION

In one form of the invention, each pixel in a liquid crystal display has an associated sensor which responds to signals produced by a hand-held stylus. Different types of sensor are possible, such as those which respond to light, magnetic fields, heat, or vibration. The sensors are polled during the refresh cycle, and appropriate action is taken, such as brightening and darkening proper pixels.

BRIEF DESCRIPTION OF THE DRAWINGS

FIG. 11 illustrates a MAGFET Hall-effect SENSOR.

DETAILED DESCRIPTION OF THE INVENTION

Overview

Figure 6:
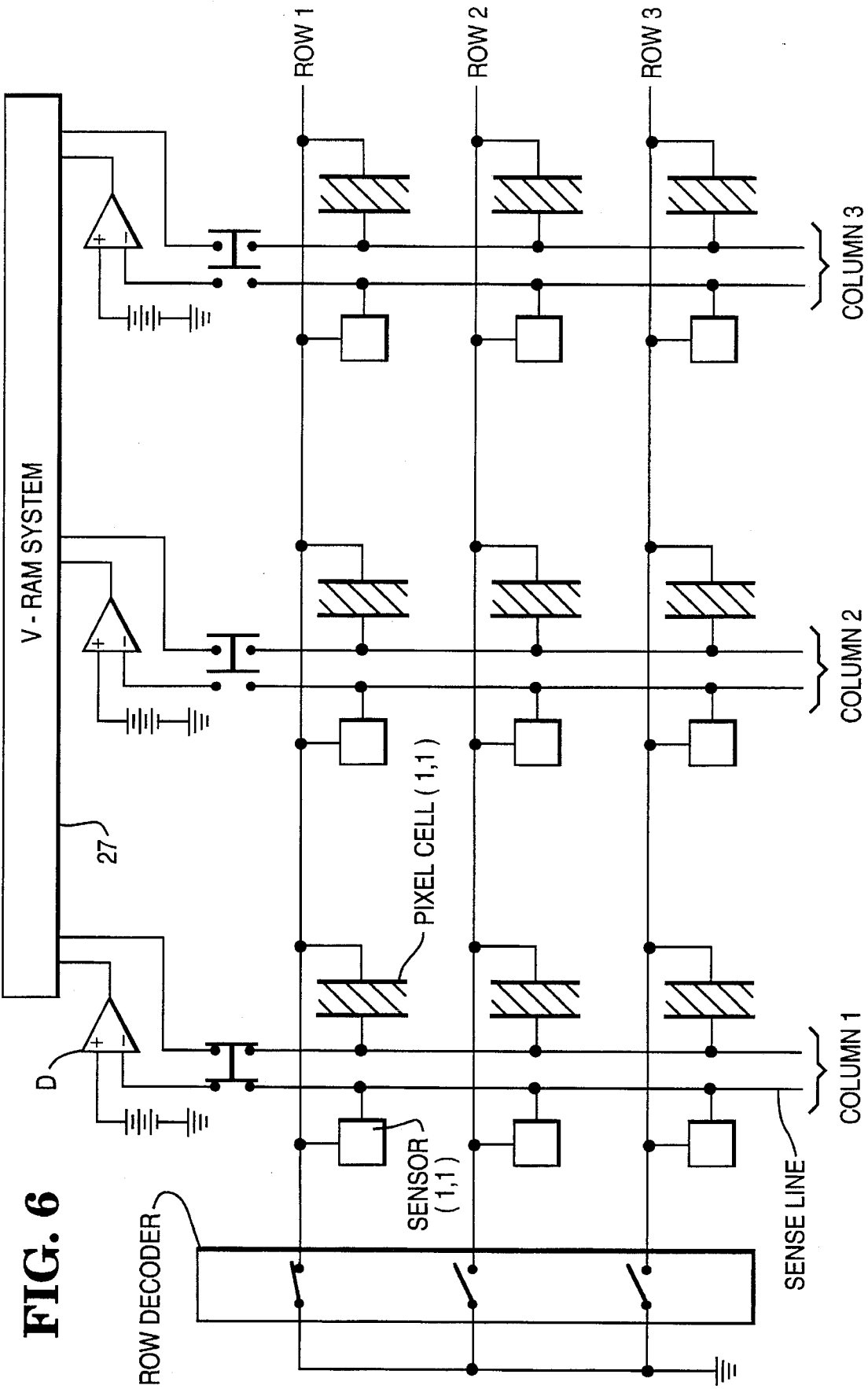
FIG. 6 illustrates one form of the invention.

FIG. 6 illustrates a 3×3 array of pixels. A SENSOR is associated with each pixel. Associated with each column of pixels is a SENSE LINE. Each SENSOR in the column connects to the column's SENSE LINE.

Figure 7:
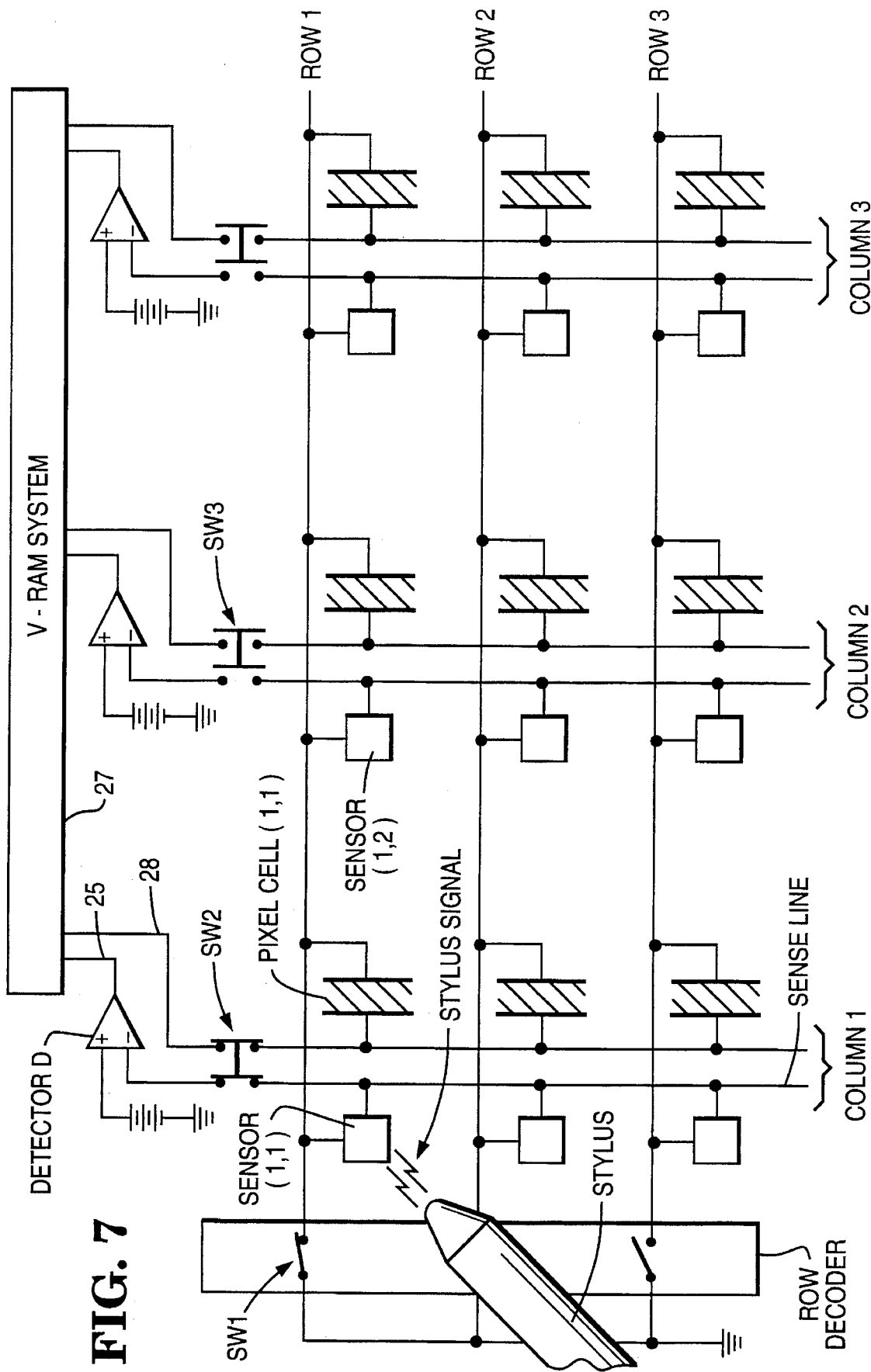
FIG. 7 illustrates a hand-held STYLUS delivering a signal to the SENSOR of FIG. 6.

When a user wishes to actuate a pixel, the user brings a hand-held input device, or STYLUS, adjacent the desired pixel, as shown in FIG. 7. The stylus produces a STYLUS SIGNAL, which is detected by the SENSOR. The sensor produces a sense signal on the SENSE LINE.

One approach for detecting the STYLUS SIGNALS is the following. As shown in FIG. 7, switch SW1 of a ROW DECODER and switch SW2 of the SENSE LINE are both closed. Any signal produced by SENSOR (1,1) can now be detected by DETECTOR D.

If SENSOR (1,1) indicates that a STYLUS SIGNAL is being received, the DETECTOR D responds, and produces a signal on line 25. The V-RAM SYSTEM 27 stores this signal in V-RAM at the location corresponding to the address of SENSOR (1,1).

The V-RAM SYSTEM then interrogates SENSOR (1,2), by opening switch SW2 and closing switch SW3. SENSOR (1,2) is read and its signal stored in V-RAM. The operation proceeds until all SENSORs have been interrogated, and all PIXEL CELLS refreshed.

Next, the V-RAM SYSTEM interrogates all memory cells in V-RAM, and applies charge to the corresponding MOS's, as appropriate, to brighten or darken each pixel. Then, the process of polling each SENSOR repeats, followed by refreshing.

Figure 7A:
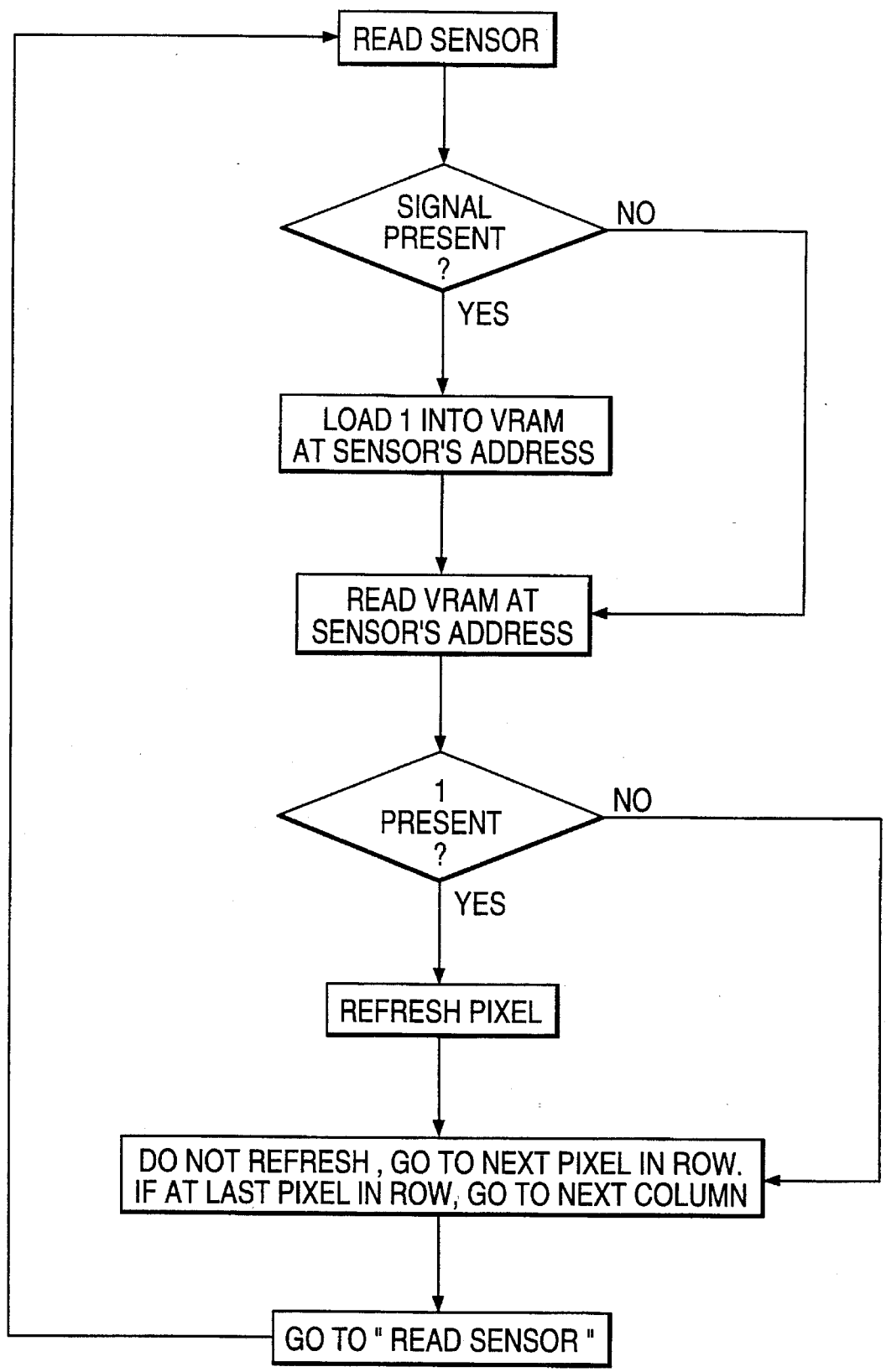
FIG. 7A is a flow chart illustrating one approach to polling the SENSORs of FIG. 6.

FIG. 7A is a flow chart illustrating the polling/refresh cycle, but slightly modified from the procedure just outlined. In the flow chart, refreshing is done for each pixel cell immediately after reading the SENSOR associated with each cell.

This reading and refreshing process is quite rapid. An entire screen of 480×600 pixels (307,200 pixels total) is refreshed every 0.005 second, or so. This rate is very fast, compared with normal motion of the human hand, so that even if the STYLUS in FIG. 7 is moving, it will dwell long enough over each SENSOR to allow detection of the STYLUS SIGNAL.

Types of Sensor

Numerous combinations of SENSOR and STYLUS are possible.

Figure 8A:
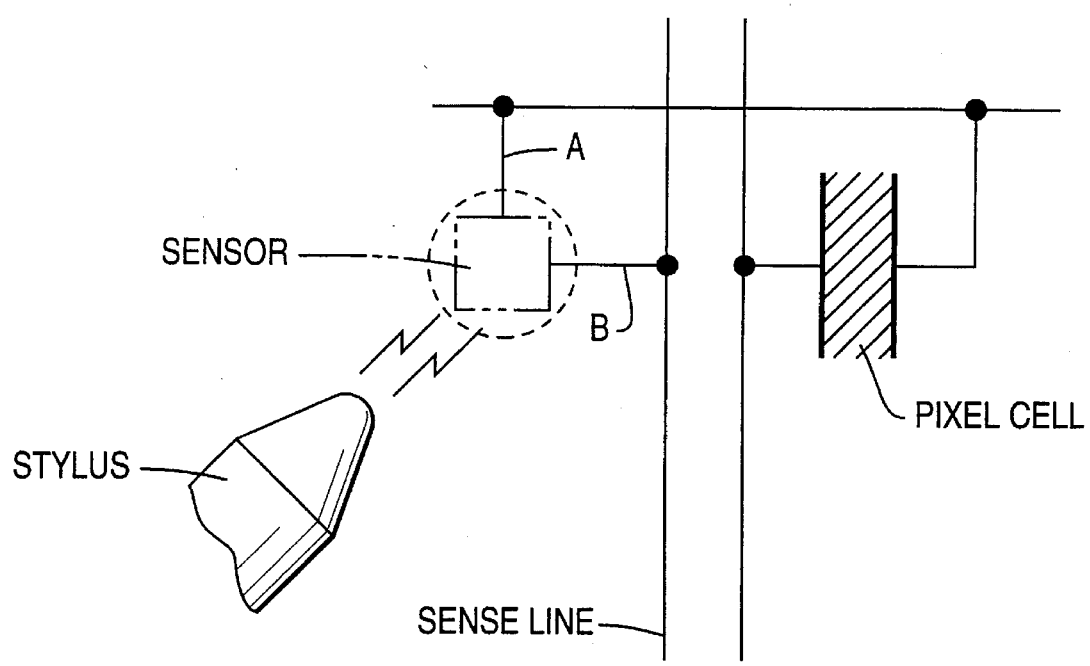
FIG. 8A illustrates a photodiode used as a SENSOR. This photodiode can respond to light, or to temperature.

Photosensor/Light-Producing Stylus. One combination is a photosensor, such as a PHOTODIODE, shown in FIGS. 8A and 8B. Other types of photosensor can be used, such as phototransistors, or photo-field-effect transistors (neither is shown).

With this combination, radiation, in the form of light, is the STYLUS SIGNAL. The photosensor produces a change in voltage, between points A and B, in response to the light.

Photosensor/Passive Stylus. Alternately, the signal produced can be darkness. That is, in this case, all SENSORS ordinarily produce signals in response to ambient light. The STYLUS is passive, and produces a shadow, by eclipsing the ambient light. The shadow causes the shadowed SENSORs to produce different signals than those exposed to ambient light.

This type of combination is perhaps best for small LCD displays. In a large display, the heel of the user's hand (which holds the STYLUS) will probably rest partly on the display and cause shadowing itself. In a small display, this type of shadowing will not occur.

Figure 9A:
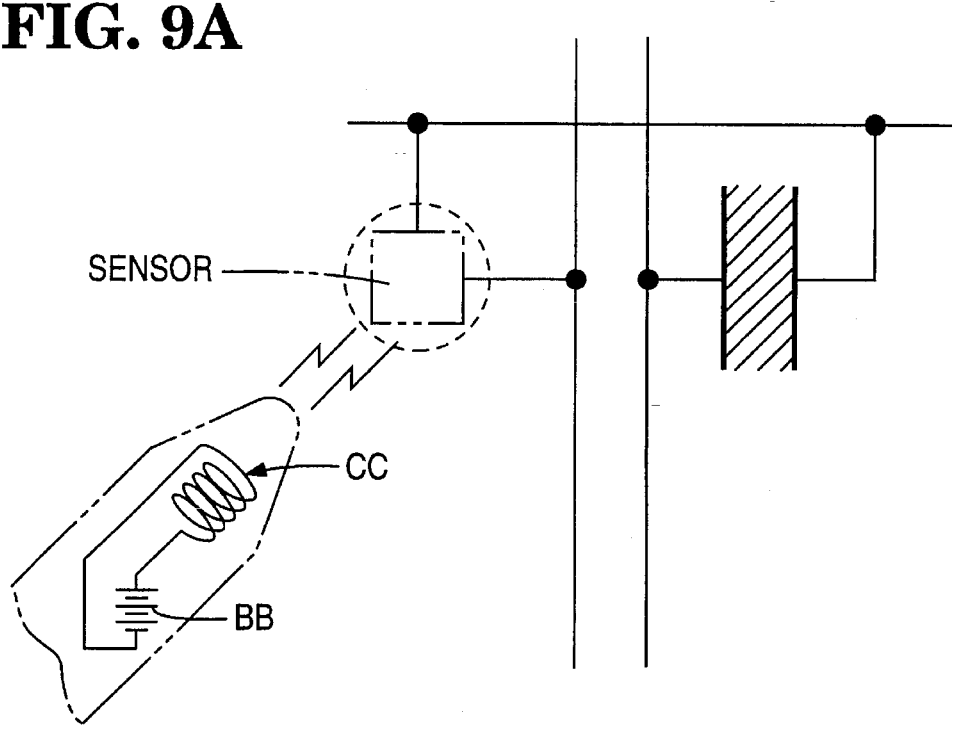
FIG. 9A illustrates one type of Hall-effect SENSOR.
Figure 9B:
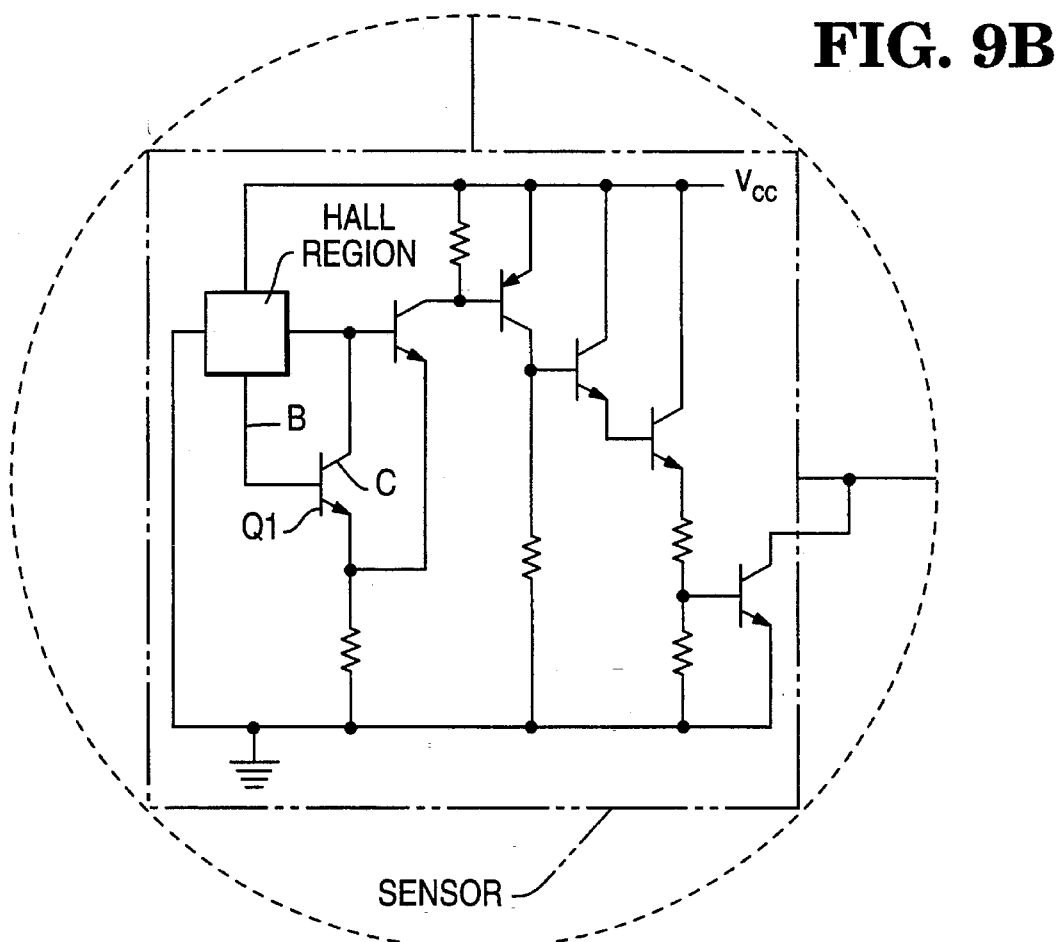
FIG. 9B is an enlarged view of the sensor of FIG. 9A.

Hall-Effect Sensor/Magnetic Stylus. A Hall-effect SENSOR can be used. In this case, the signal produced by the stylus will be a magnetic signal. One type of Hall-effect sensor, known in the prior art, is shown in FIG. 9A and 9B. With no magnetic field applied by the stylus, current flows through the Hall Region, as though flowing through a normal resistor. However, when a magnetic field is applied, a Hall voltage is produced, which produces a voltage between the collector C and base B of transistor Q1. The actuation of Q1 is detected by the remaining transistors.

The magnetic field is produced by coil CC contained within the STYLUS. The coil CC is powered by a battery BB.

It is known in the Prior Art how to construct such a HALL REGION of size 10×10 mils.

Figure 10A:
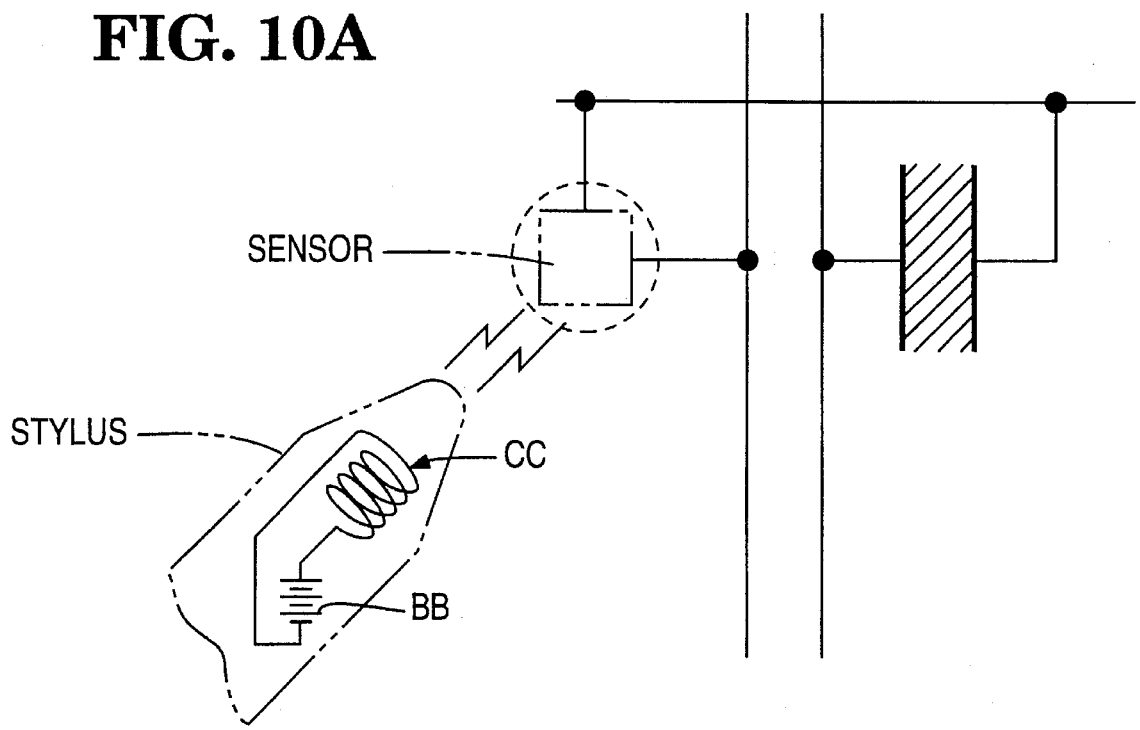
FIG. 10A illustrates a magnetoresistive SENSOR.

Magnetoresistive Sensor/Magnetic Stylus. A magnetoresistive sensor can be used as shown in FIG. 10A. In this case, the signal produced by the stylus is magnetic. The magnetic signal is detected by a magnetoresistive material.

Figure 10B:
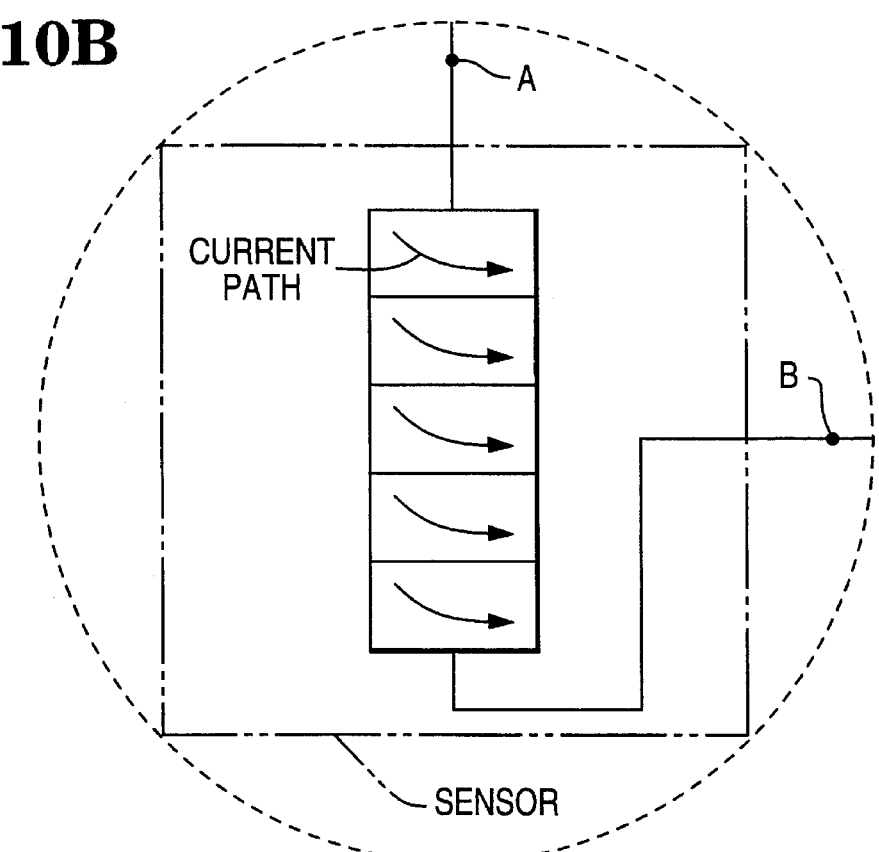
FIG. 10B is an enlarged view of the sensor of FIG. 10A.

There are two major classes of magnetoresistive material. In one, a magnetic field (not shown) forces the current to traverse a longer path than it would ordinarily. FIG. 10B indicates this longer CURRENT PATH. The magnetic field is perpendicular to the plane of the Figure. The longer path produces a larger voltage drop between points A and B, which is detected. Magnetoresistive sensors are known in the art.

A second class of sensor does not utilize a longer current path, but relies on giant magneto-resistive molecules. The SENSOR in FIG. 10B is constructed using these molecules. A magnetic field distorts the molecules, causing a change in resistance, which is detected in a customary manner.

MAGFET Sensor/Magnetic Stylus. Hall contacts can be added to a large-channel, enhancement-mode, MOSFET having large channel dimensions, and which is operated in either pinch-off or triode mode. One example is shown in FIG. 11. Such MOSFETs are called MAGFETs, and are known in the art. A magnetic stylus is used.

Figure 12:
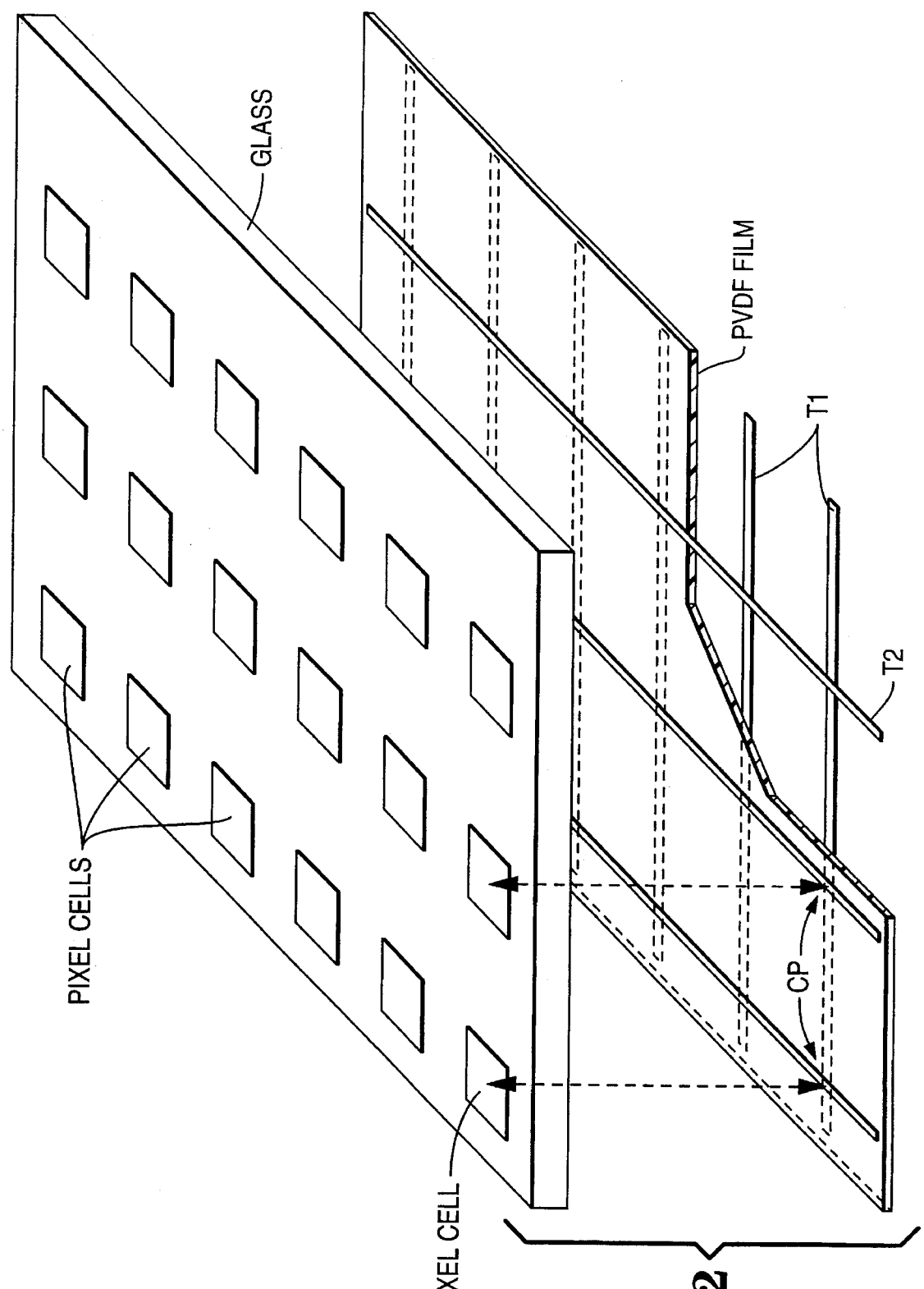
FIG. 12 illustrates a Poly Vinyl DiFluoride (PVDF) film used as a SENSOR.

Piezo-Electric Sensor/Passive Stylus. A transparent poly vinyl difluoride (PVDF) film can be attached to the glass, as shown in FIG. 12. One supplier of such film is Pennwalt Corporation, located in King of Prussia, Pa., which sells the film under the generic name "piezo-electric film" and the trade name KYNAR.

The PVDF film contains signal traces T. Horizontal traces T1 are located on the bottom of the film; vertical traces T2 are located on the top. The crossing points CP are positioned beneath respective PIXEL CELLs, as indicated.

Figure 13:
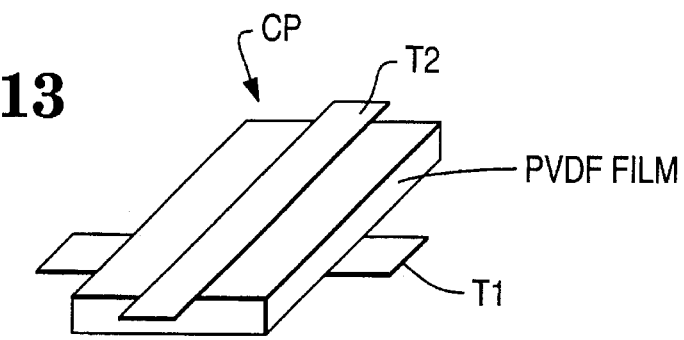
FIG. 13 illustrates a crossing point CP of traces T1 and T2 on the PVDF film.
Figure 14:
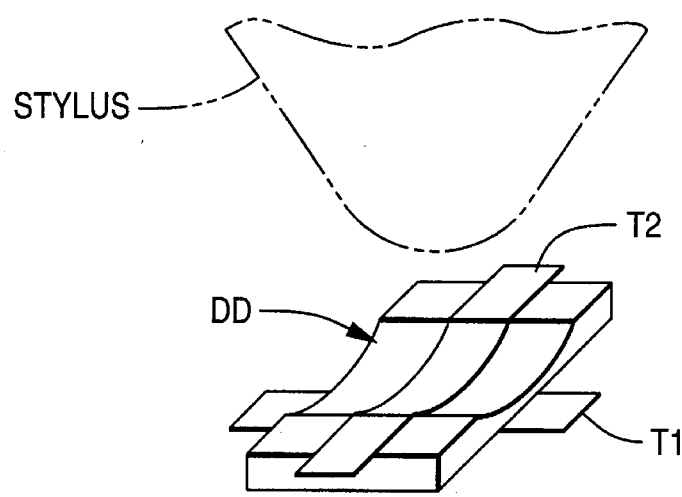
FIG. 14 illustrates a STYLUS making a depression DD at the crossing point CP of FIG. 13.
Figure 15:
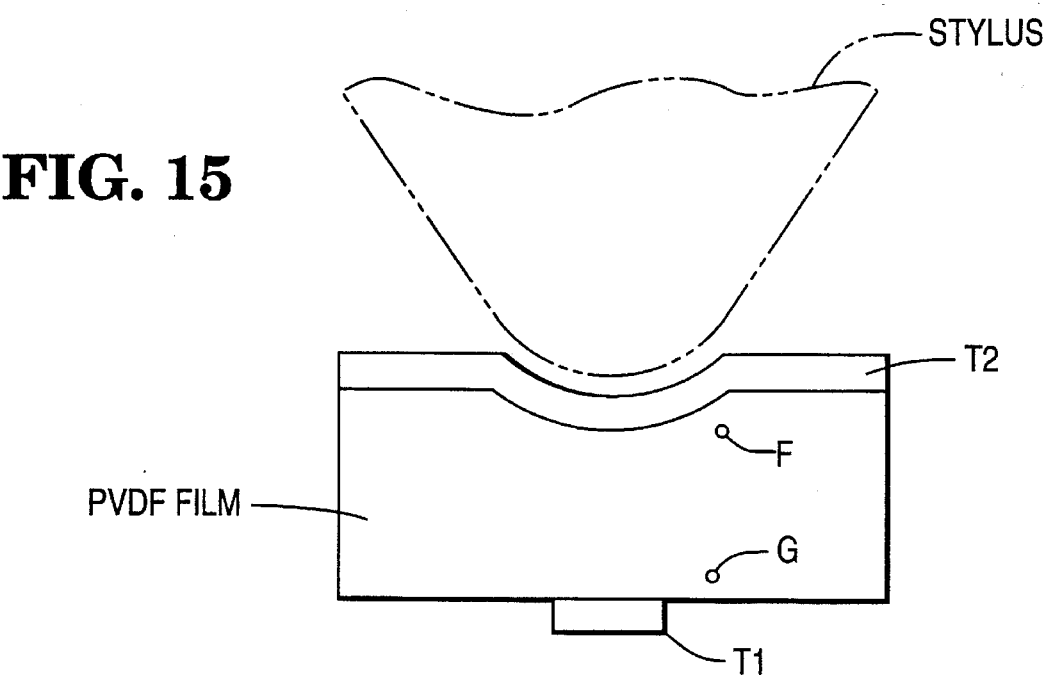
FIG. 15 illustrates a voltage developed by the depression DD of FIG. 14.

FIG. 13 shows an enlarged view of a crossing point. When the stylus presses upon the PVDF film, it creates a depression D, as shown in FIG. 14. The depression causes a voltage to arise between points F and G in FIG. 15. This voltage is detected on the traces T1 and T2, by a detector such as D in FIG. 7.

The PVDF film is a type of strain gauge, albeit distributed uniformly across the LCD display. Alternately, conventional strain gauges can be used, one at each crossing point CP in FIGS. 12 and 13.

Figure 16:
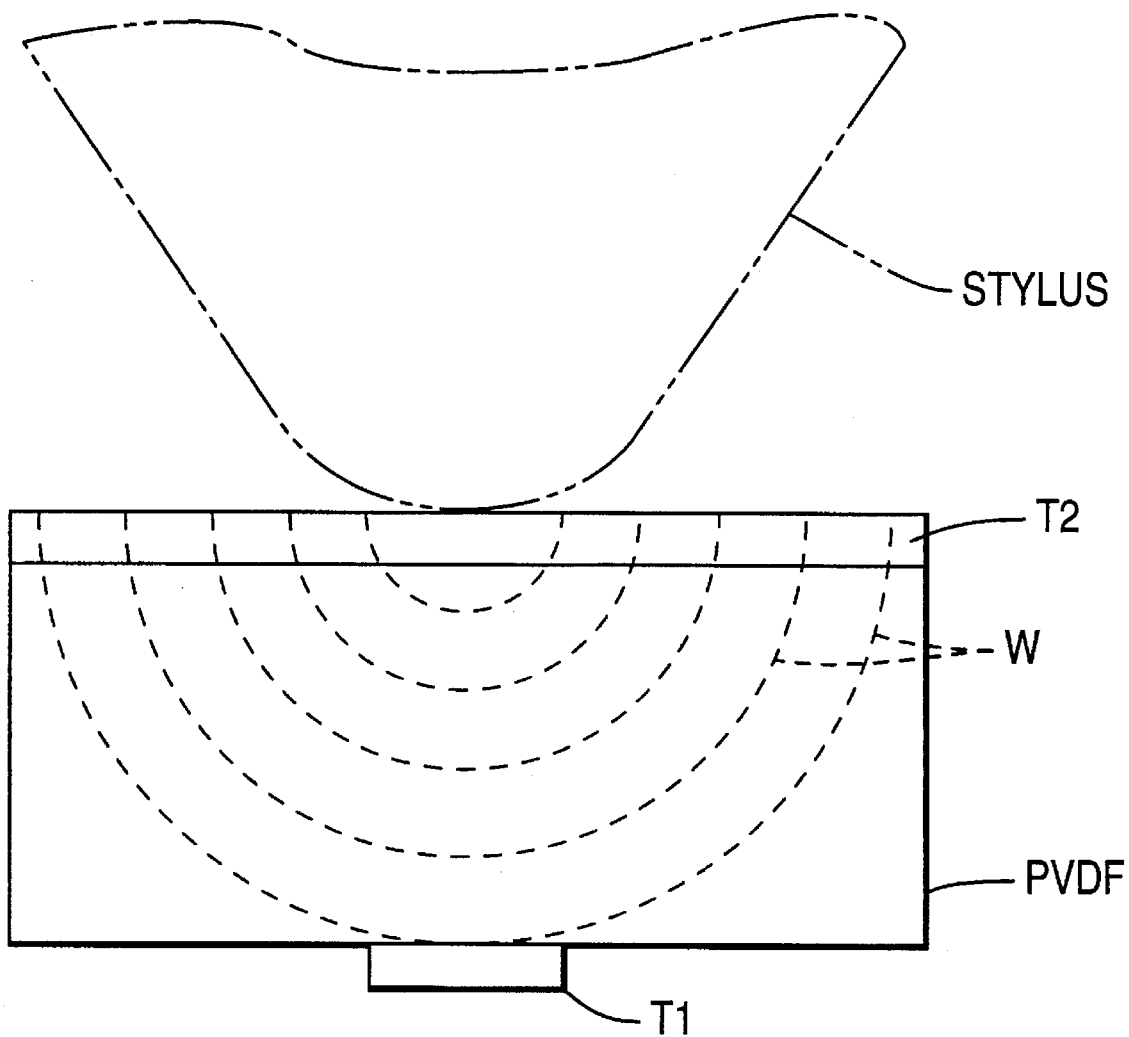
FIG. 16 illustrates an acoustic wave W being transmitted by the STYLUS into the PVDF film.

Piezo-Electric Sensor/Active Stylus. The STYLUS can be active; it can produce an acoustic signal, indicated by sound waves W in FIG. 16. The sound waves, upon entering the PVDF film, cause compressions and rarifactions, which produce detectable voltages.

To produce the sound, the STYLUS can contain a transducer, such as a piezo-electric speaker, and an electrical oscillator, which cause the tip of the STYLUS to vibrate.

An oscillator requires a power supply, such as a battery, and this requirement can be disadvantageous. To eliminate a power supply, the acoustic signal can be produced by energy supplied by the human user of the STYLUS. For example, as shown in FIGS. 17A–17D, the STYLUS contains a hammer 50. When the user's finger (not shown) pulls a trigger 53, the trigger 53 pulls the hammer 50 back until a pin 56 disengages the hammer 50 from the pin, via cam 58. Upon disengagement, a spring 59 drives the hammer 50 into contact with the tip of the STYLUS, producing a sound 62. The sound 62 causes compression and decompression in the PVDF film in FIG. 16, producing a signal on traces T1 and T2.

Figure 17A:
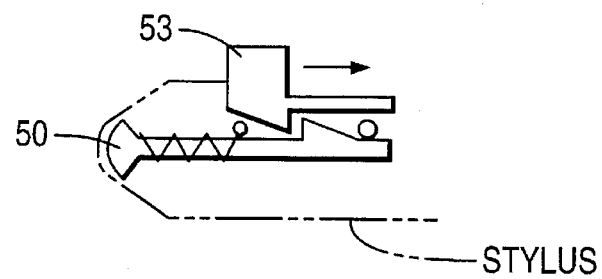
FIG. 17A–17D illustrate operation of and a manually powered acoustic signal generator.
Figure 17B:
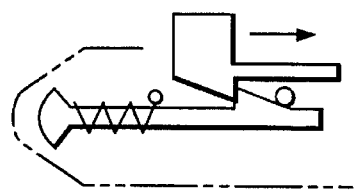
Figure 17C:
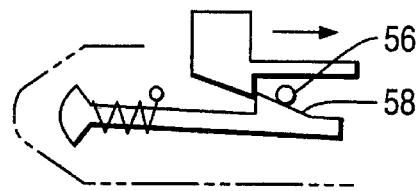
Figure 17D:
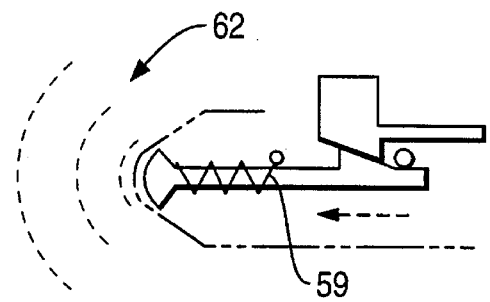
Figure 17E:
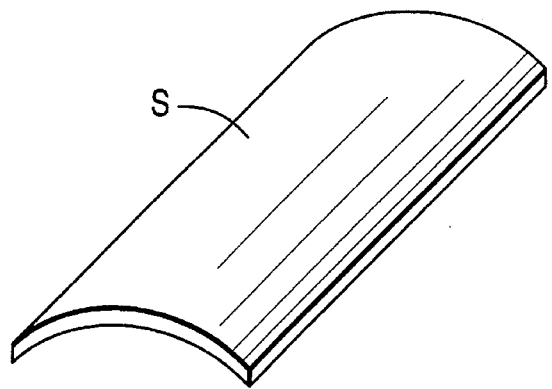
FIG. 17E illustrates a bent, flat spring, which produces an acoustic signal when deformed.

There are numerous other ways of producing an acoustic signal, or clicking sound, based on motion of a finger. For example, a flat leaf spring S in FIG. 17E, having a slightly C-shaped cross section, will produce a "click" when bent. Similarly, a steel diaphragm (not shown) having a bulge formed into it (resembling the bottom of an oilcan) produces a "click" when deformed. Other types of finger-operated noise-makers are known.

The acoustic signal must persist long enough for the refresh circuitry to detect it. That is, the acoustic signal should last longer than one refresh cycle. (If the acoustic signal lasted, for example, ⅕ of a refresh cycle, it could disappear before the SENSOR detecting the signal were polled.) To produce a signal of longer duration, the trigger mechanism of FIG. 17A can pluck a string or tuning fork, producing a sustained note which excites the PVDF film.

Figure 18:
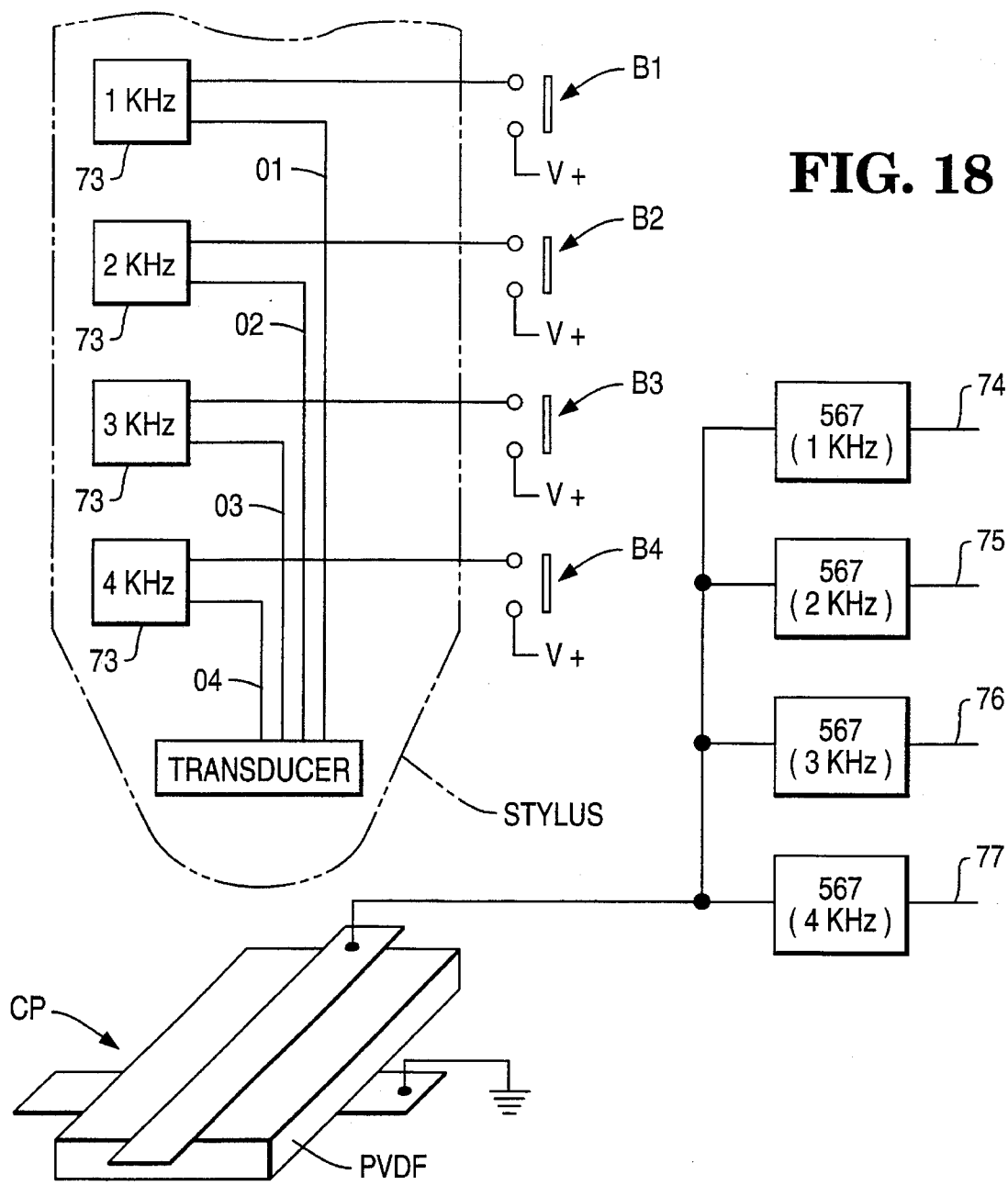
FIG. 18 illustrates a STYLUS having multiple oscillators 73.

Acoustic Signal, Multiple Frequencies. The STYLUS can contain multiple oscillators 73, each operating at a different frequency, as shown in FIG. 18. Each crossing point CP (also shown in FIG. 13) acts as a transducer which responds to all oscillators. A DISCRIMINATOR detects which signal was sent.

As an example, the STYLUS has four buttons B1–B4, which actuate switches, and which produce one of the following frequencies: 1 KHz, 2 KHz, 3 KHz, or 4 KHz. The crossing point CP produces a time-varying voltage at the frequency received. The DISCRIMINATOR can comprise four LM 567 integrated circuits, as indicated. Each 567 is tuned to one of the STYLUS's frequencies. Thus, if the STYLUS produces a signal of 2 KHz, line 75 produces a signal. If the STYLUS produces a signal of 4 KHz, line 77 produces a signal.

The different signals can be used to draw lines of different color. For example, one frequency can call for red color. Another for blue color, and so on. This type of STYLUS can be used with the color V-RAMs described later.

Figure 18A:
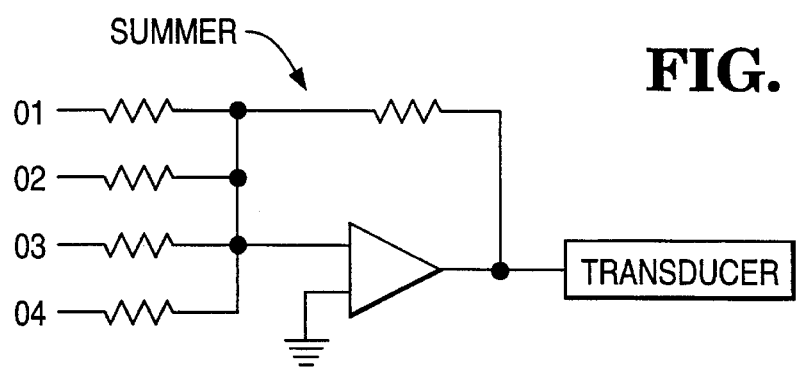
FIG. 18A illustrates a SUMMER for adding the oscillator signals of FIG. 18.

More than one frequency can be produced by the STYLUS simultaneously. In this case, the oscillators' outputs 01–04 are added in a SUMMER in FIG. 18A, which feeds the transducer TRANS, perhaps through an amplifier (not shown). The 567's respond as usual. Now, a four-bit binary word is transmitted by the STYLUS.

Flexible LCD Screen. Thin sheets of material, in the range of one mil thick, are available which contain encapsulated drops of liquid crystal material. One supplier is Raychem Corporation, located in Menlo Park, Calif. This material is known as "Polymer Dispersed Liquid Crystal" (PDLC) or "Nematic Curvilinear Aligned Phase" (NCAP) film material. Such materials can be used as the LCD display.

Figure 19A:
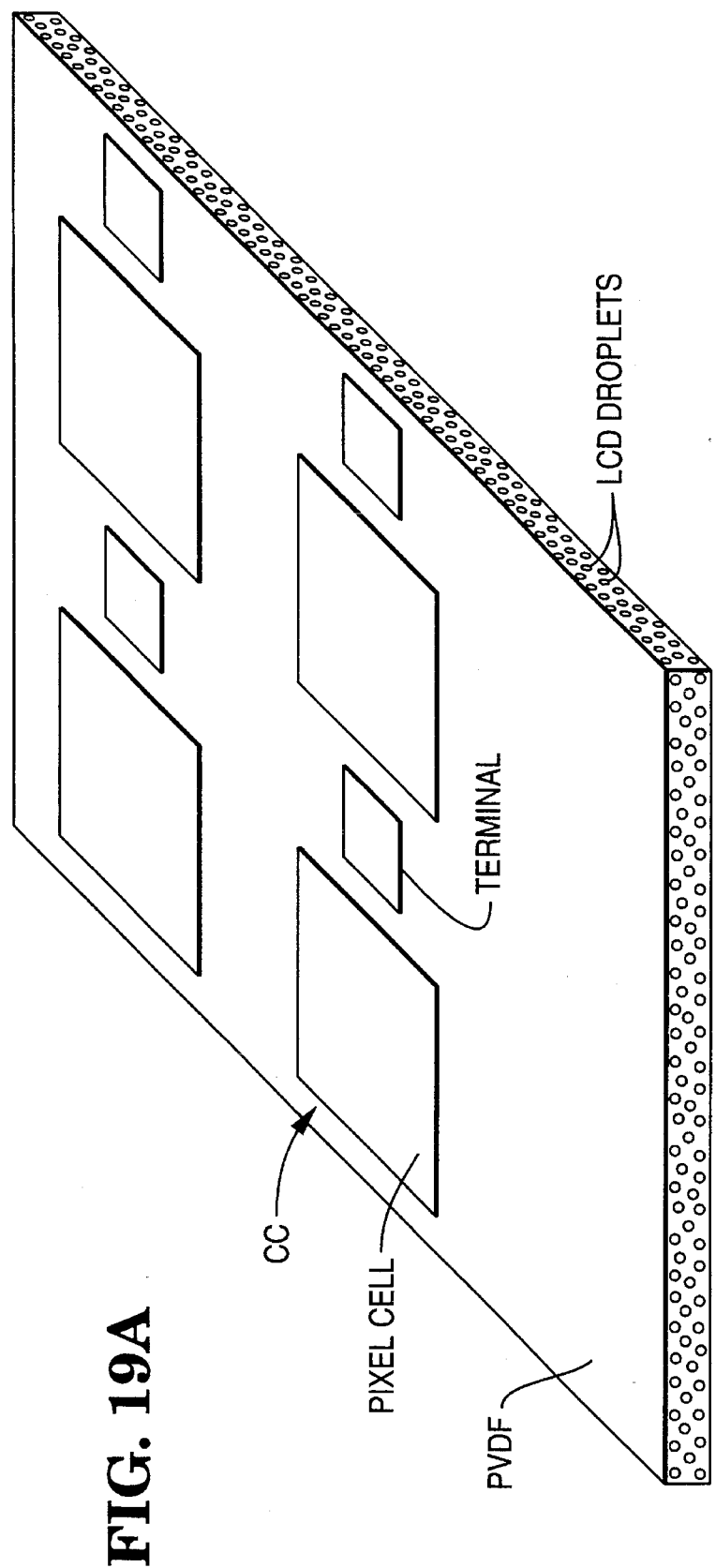
FIG. 19A illustrates a PVDF sheet containing liquid crystal droplets.
Figure 19B:
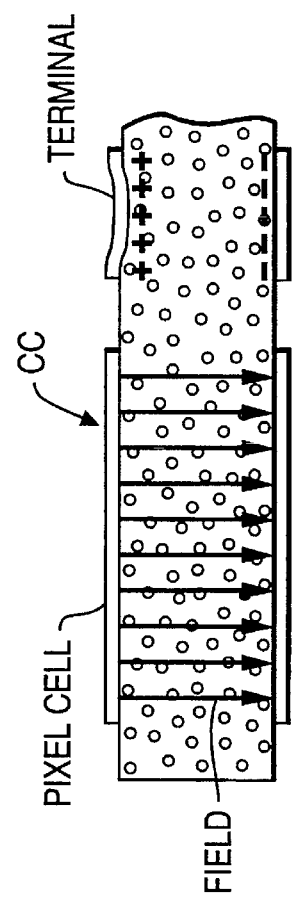
FIG. 19B is a cross-sectional view of a portion of the sheet of FIG. 19A.

Alternately, as shown in FIG. 19A, this sheet material can be constructed of PVDF. When the STYLUS is applied to the sheet, it produces a voltage detected by the TERMINALs, as indicated by the + and − symbols as shown in the cross-sectional view of FIG. 19B. This voltage is detected and stored in V-RAM, as described above.

Transparent capacitors CC, of very thin metal, form the PIXEL ELEMENTs. A voltage applied to the capacitor CC will darken the PIXEL CELL, as described above. The connectors are not shown in FIG. 19A, for simplicity.

Temperature-Sensitive Sensor/Heat-Producing Stylus. The SENSORs can be temperature-sensitive. One such SENSOR is the P-N diode. The current-voltage expression for such a diode is the following:

$$I=I_o[\exp(qV/kT)-1]$$

wherein $I_o$ is reverse saturation current q is the charge on the electron

V is the voltage across the junction k is Boltzmann's constant

T is temperature, degrees Kelvin.

If current is held constant, then the voltage is proportional to temperature of the diode. The voltage V changes by about 2 millivolts for each degree C change in temperature, provided current I is held constant.

Figure 8B:
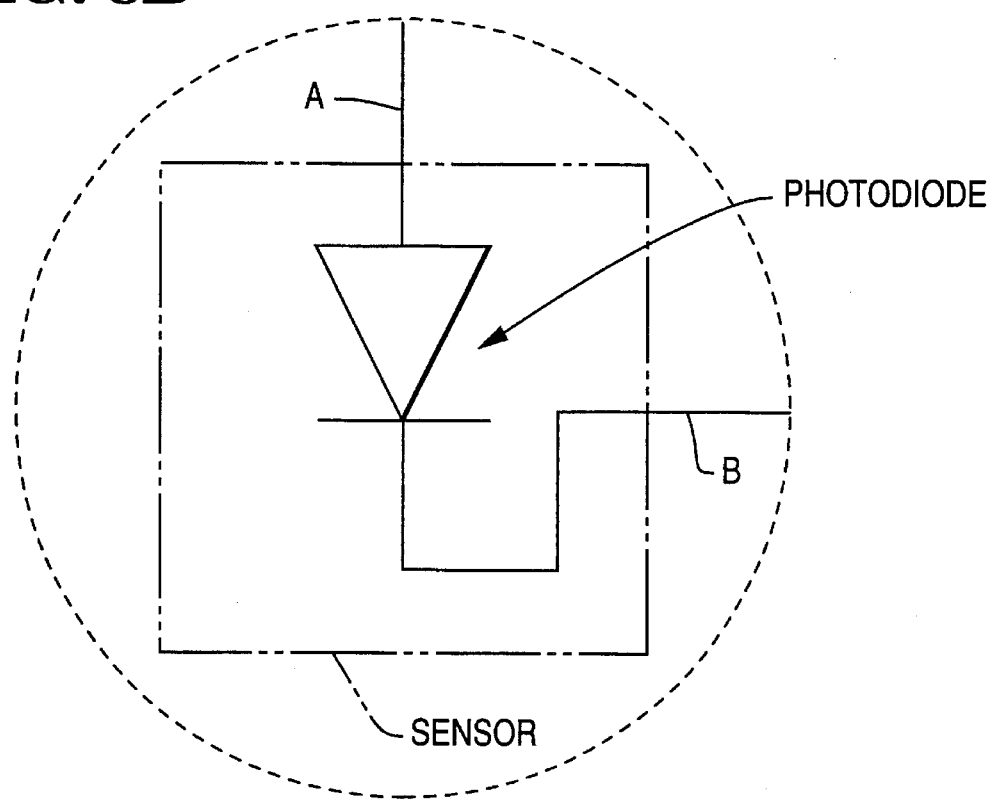
FIG. 8B is an enlarged view of the sensor shown in FIG. 8A.

Thus, the P-N diode of FIG. 8B can be used. The STYLUS contains a source of heat, such as a laser diode, or an infrared light source.

A bipolar junction transistor can also be used as the SENSOR: it contains two diodes: one at the base-collector junction, and the other at the base-emitter junction.

The current fed to the diode must be held constant, as stated above. Constant current sources are known in the art.

Figure 20:
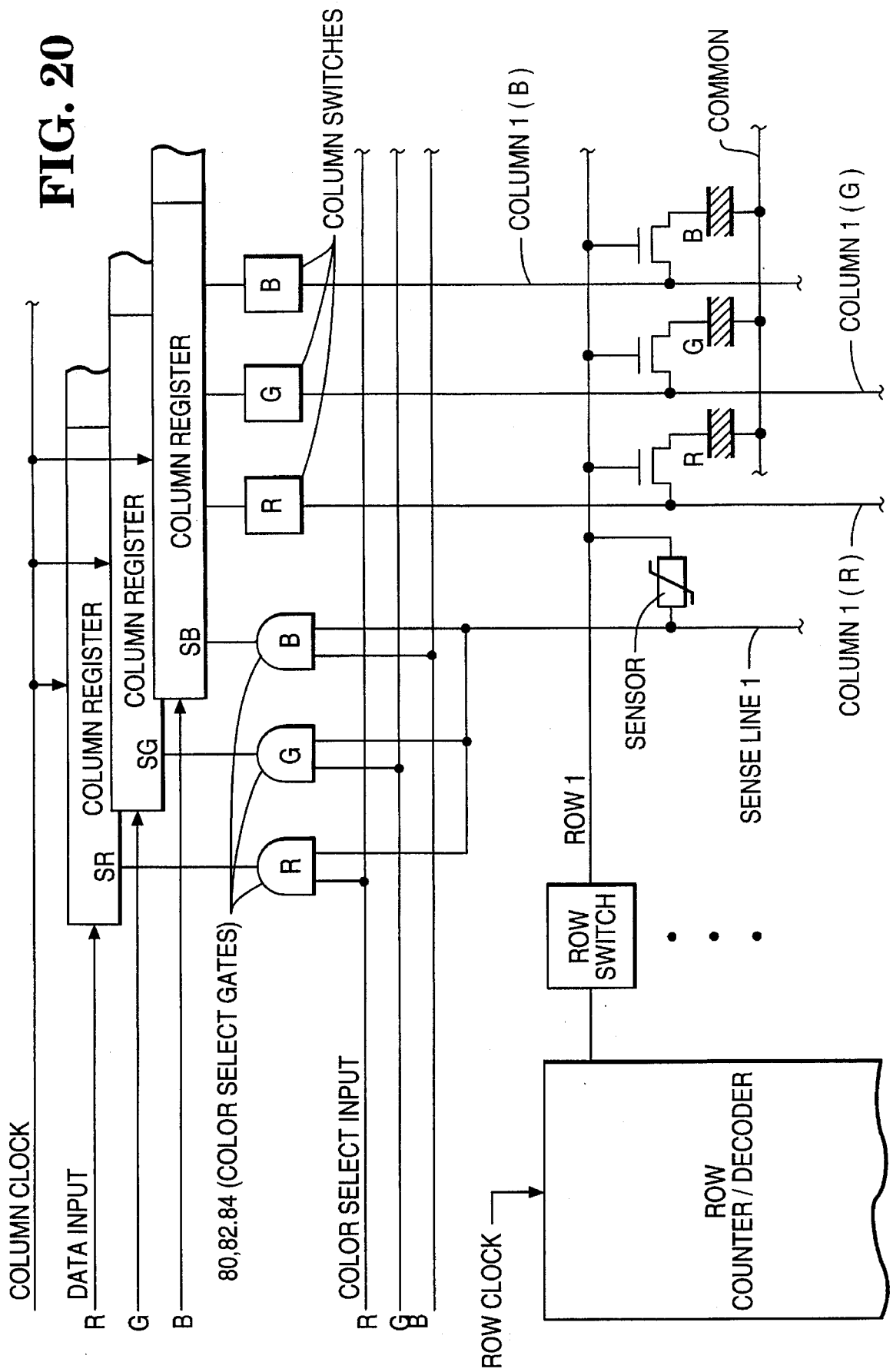
FIG. 20 illustrates use of the STYLUS to produce color signal input.

Color Display. FIG. 20 shows how the SENSOR can be used to provide data indicative of the desired color of a pixel, in addition to position data. A user actuates one, or a combination, of the three COLOR SELECT INPUTs, R (red), G (green), or B (blue). The AND-gates 80, 82, and 84 accordingly deliver the signal produced by the SENSOR to the respective column registers.

For example, if the user selects R and B, then lines SR and SB deliver signals to the column registers of the V-RAM.

Each pixel has associated three capacitors, for the three colors, namely, R, G, and B, as indicated.

Figure 1:
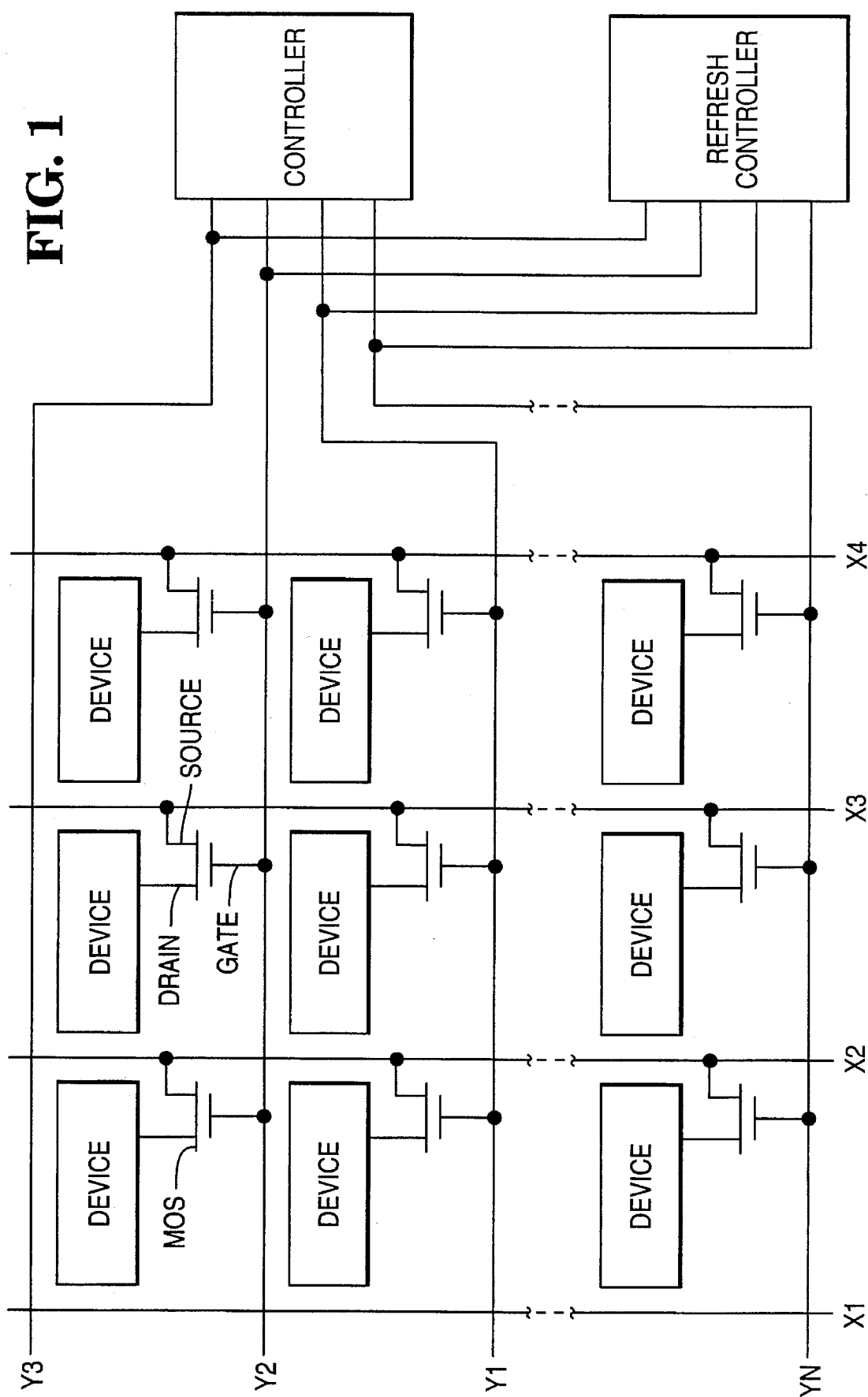
FIG. 1 illustrates a nine-element liquid-crystal display (LCD).
Figure 2:
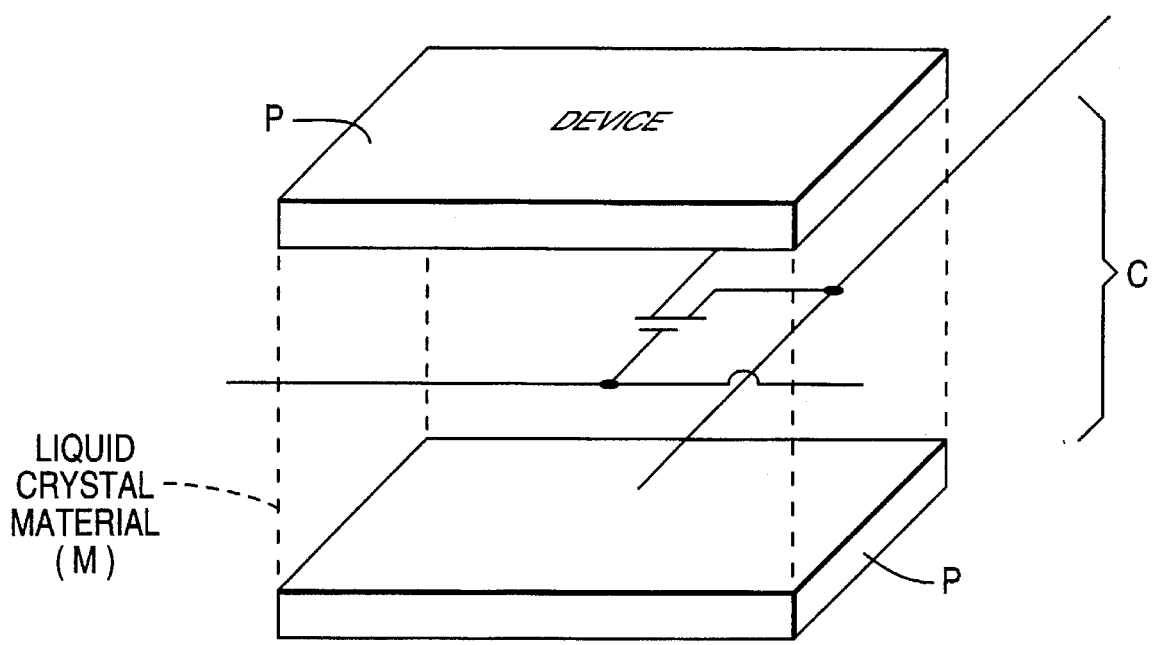
FIG. 2 illustrates a single element of the LCD.
Figure 3A:
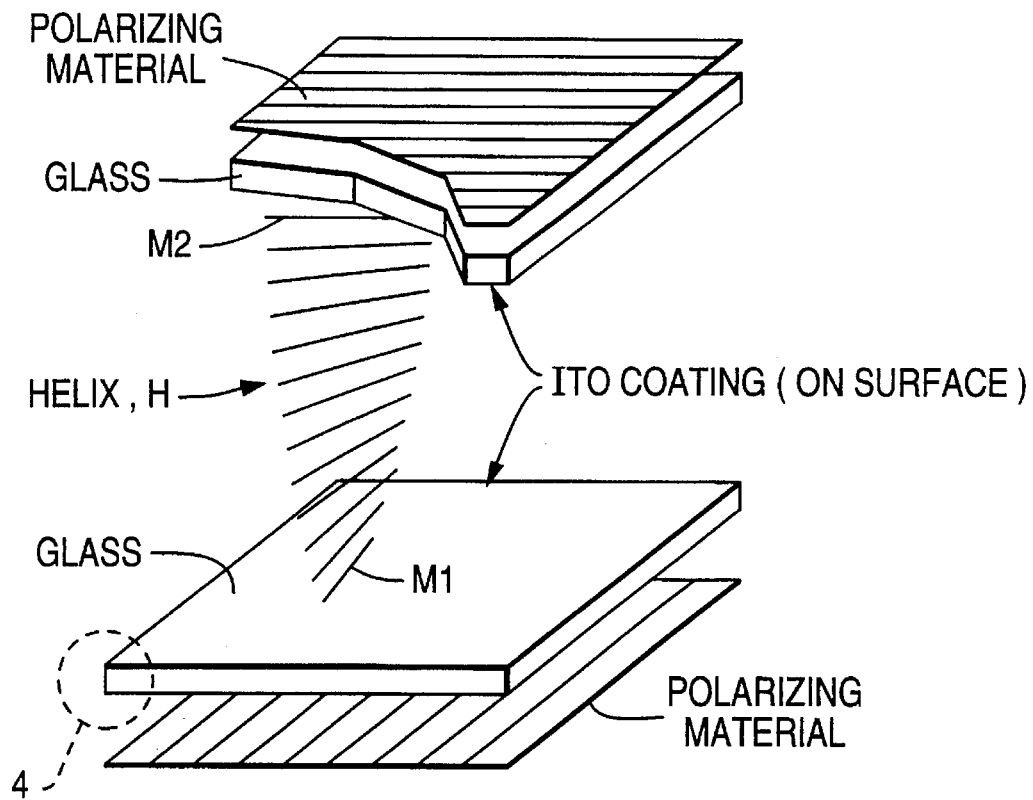
FIG. 3A illustrates a liquid crystal pixel.
Figure 3C:
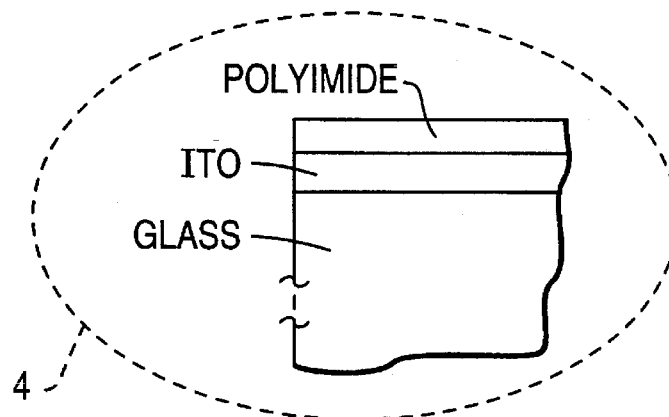
FIG. 3C is an enlarged view of the area 4 of FIG. 3A.
Figure 3B:
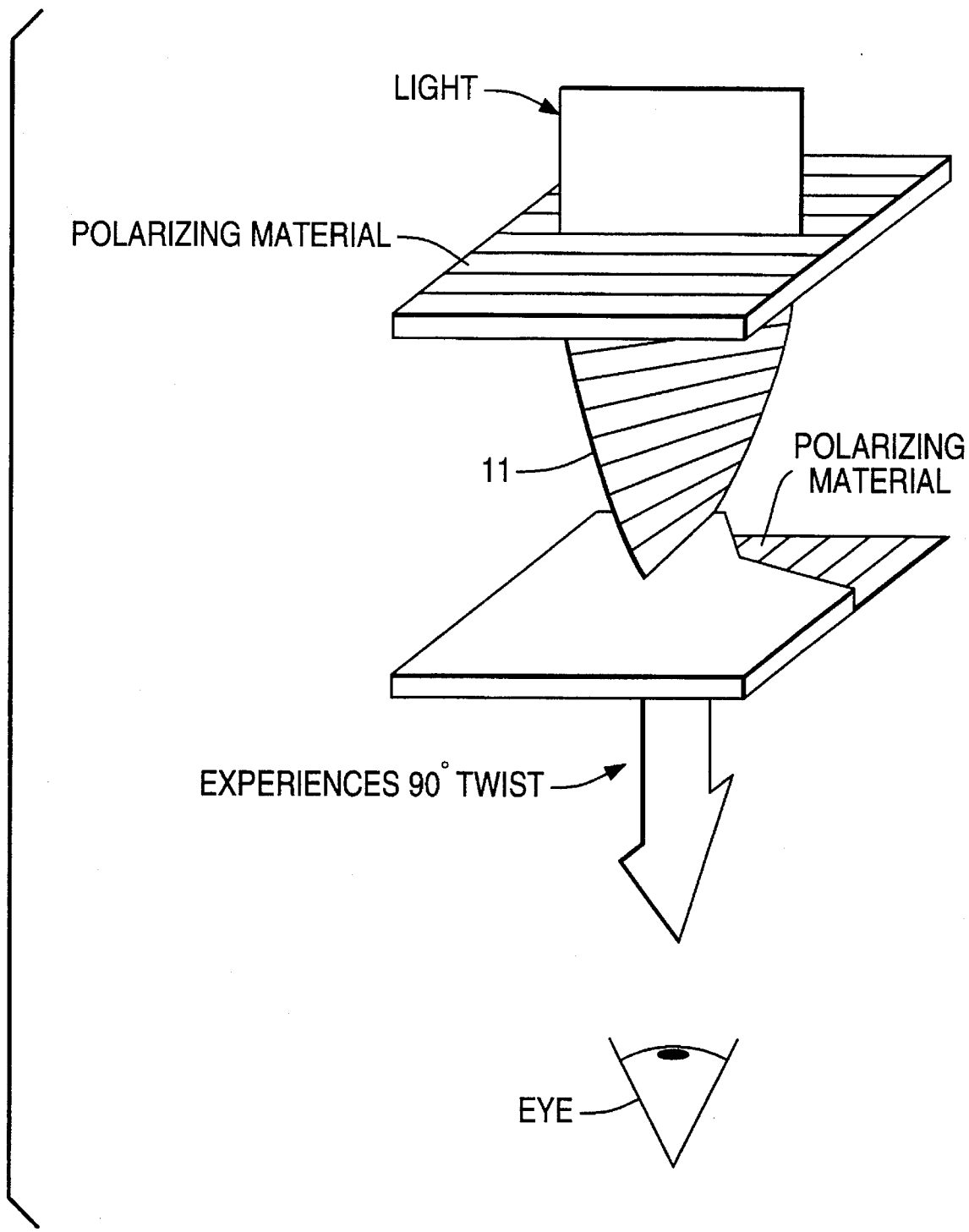
FIG. 3B illustrates light being twisted by the pixel of FIG. 3A.
Figure 4:
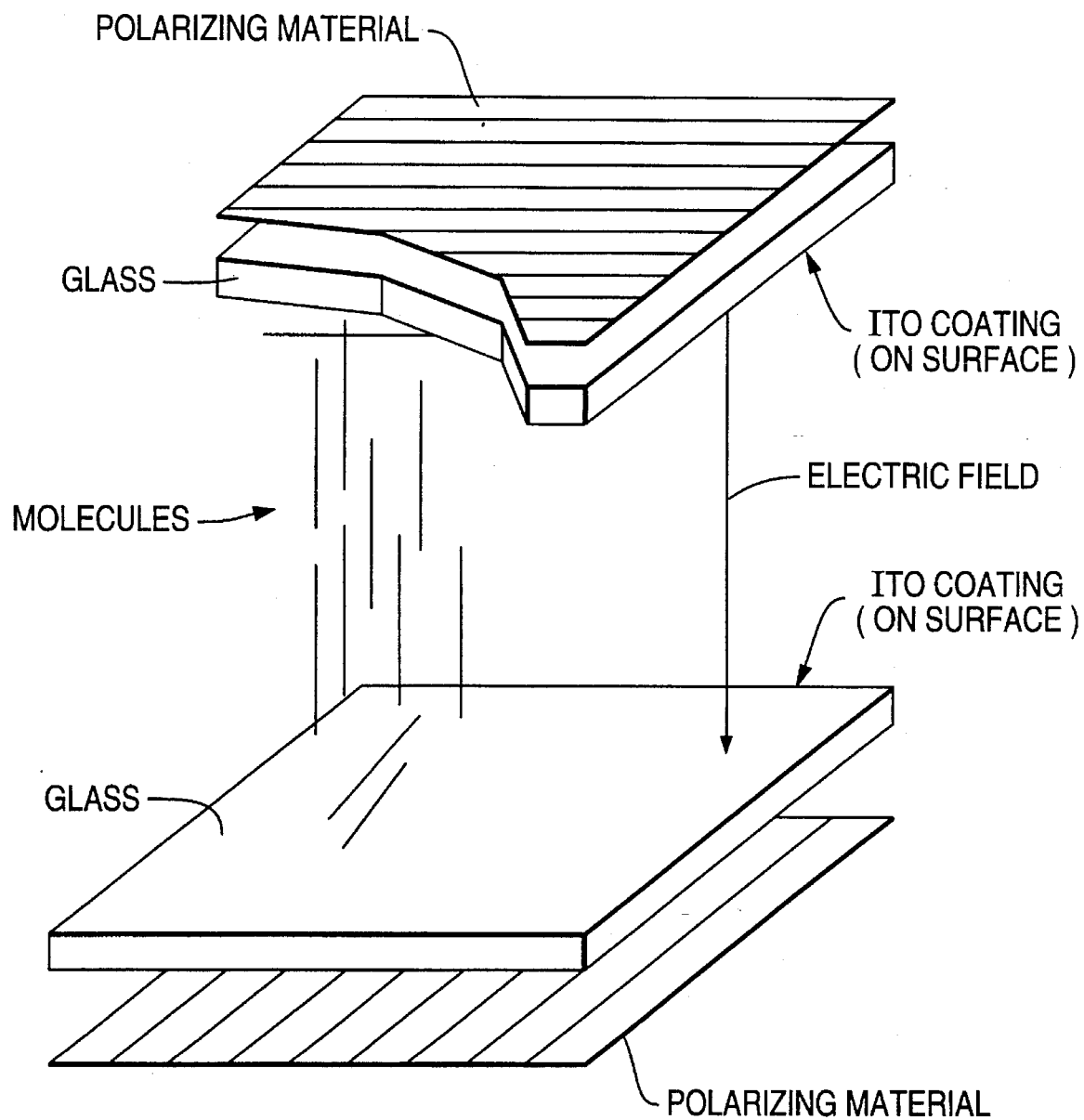
FIGS. 4 and 5 illustrates blockage of light caused by application of a voltage to the pixel of FIG. 3A.
Figure 5:
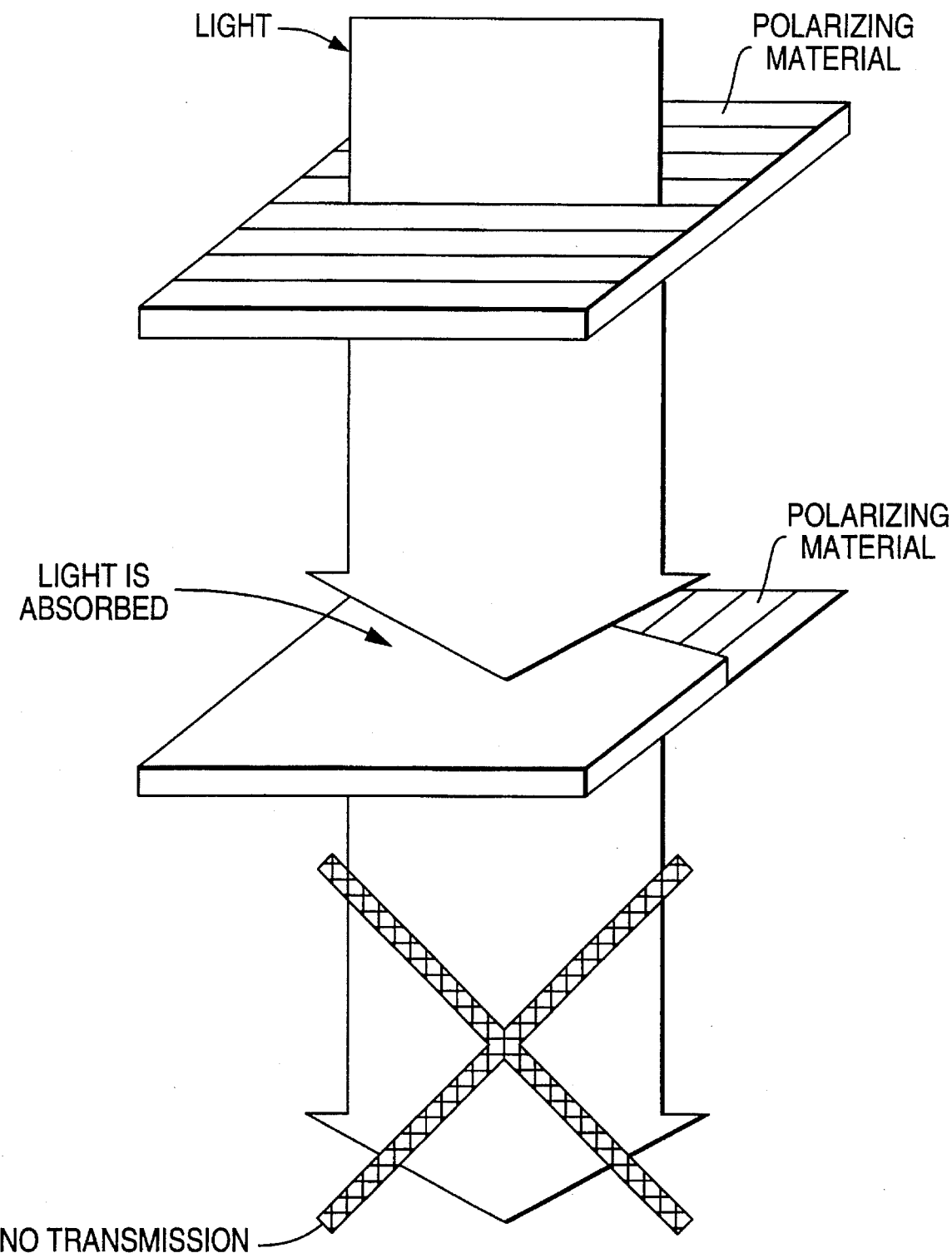
Figure 21:
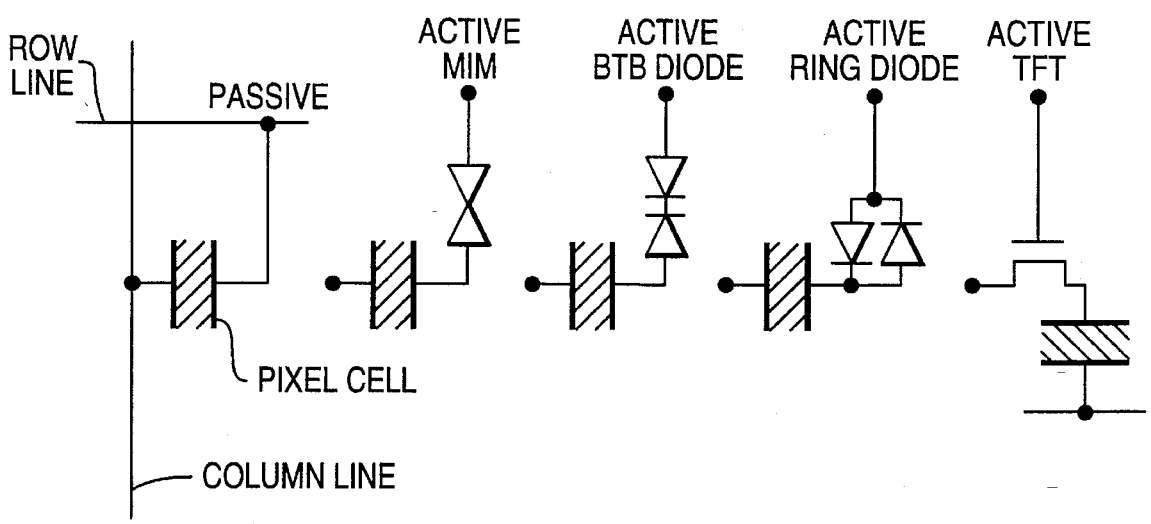
FIG. 21 illustrates different types of actuators for the DEVICEs of FIG. 1. These different types can replace the MOSs in FIG. 1.

Alternate Pixel Actuation. The pixels need not be activated by the MOS transistors indicated in FIG. 1. Four other approaches to actuation are shown in FIG. 21. These are known in the art.

MIM refers to Metal-Insulator-Metal structures, such as Chrome-Tantalum pentoxide-Tantalum.

BTB refers to back-to-back diodes.

TFT refers to Thin Film Transistors.

Numerous substitutions and modifications can be undertaken without departing from the true spirit and scope of the invention. What is desired to be secured by Letters Patent is the Invention as defined in the following claims.

I claim:

1. In a liquid crystal display having multiple pixels, the improvement comprising:

a plurality of sensor devices, each of said sensor devices being physically positioned adjacent a corresponding one of the pixels and each of said sensor devices being adapted for producing a detectable signal in response to input excitation from a hand-held stylus;

a first plurality of sense lines connected to respective ones of said sensor devices for carrying signals produced by said sensor devices;

a second plurality of pixel energization lines which are distinct from said first plurality of sense lines, said energization lines being connected to respective ones of the pixels; and a third plurality of excitation lines connected to both said sensor devices and the pixels whereby said sensor devices are independently operable from the pixels.

2. Apparatus according to claim 1 in which the sensors are of the type which detect light.

3. Apparatus according to claim 1 in which the sensors are of the type which detect magnetic fields.

4. Apparatus according to claim 1 in which the sensors are of the type which detect mechanical deformation.

5. The liquid crystal display of claim 4 in which said sensor devices comprise strain gauges.

6. Apparatus according to claim 1 in which the sensors are of the type which detect change in temperature.

7. Apparatus according to claim 5 in which the temperature sensor includes a PN diode which produces a signal when its temperature changes.

8. Apparatus according to claim 7 and further comprising means for maintaining a constant current through said PN junction.

9. Apparatus according to claim 1 in which the sensors are of the type which detect vibration.

* * * * *